(12) United States Patent
Ha

(10) Patent No.: US 7,359,016 B2
(45) Date of Patent: Apr. 15, 2008

(54) TRANSFLECTIVE TYPE LIQUID CRYSTAL DISPLAY DEVICE HAVING RETARDATION FILM AND METHOD OF FABRICATING THE SAME

(75) Inventor: Kyoung-Su Ha, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 359 days.

(21) Appl. No.: 11/010,307

(22) Filed: Dec. 14, 2004

(65) Prior Publication Data
US 2005/0140863 A1 Jun. 30, 2005

(30) Foreign Application Priority Data
Dec. 30, 2003 (KR) .................. 10-2003-0100324

(51) Int. Cl.
*G02F 1/1335* (2006.01)
*G02F 1/1337* (2006.01)

(52) U.S. Cl. .................. 349/117; 349/114; 349/126

(58) Field of Classification Search ................ 349/114, 349/117–121
See application file for complete search history.

(56) References Cited

U.S. PATENT DOCUMENTS

| 5,818,559 | A  | * | 10/1998 | Yoshida ................ 349/122 |
| 6,614,496 | B1 | * | 9/2003  | Song et al. ............. 349/114 |
| 2002/0041351 | A1 | * | 4/2002 | Baek .................... 349/114 |
| 2003/0043323 | A1 | * | 3/2003 | Roosendaal et al. ...... 349/113 |

* cited by examiner

*Primary Examiner*—Michael H. Caley
(74) *Attorney, Agent, or Firm*—McKenna, Long & Aldridge LLP

(57) ABSTRACT

A reflective type liquid crystal display device includes: first and second substrates facing each other and having a transmissive portion and a reflective portion; a first polarizing plate on an outer surface of the first substrate; a transparent electrode over an inner surface of the first substrate; a reflective electrode having an open portion corresponding to the transmissive portion; a retardation film on an outer surface of the second substrate, the retardation film including a first portion having a first retardation value and a second portion having a second retardation value different from the first retardation value; a second polarizing plate on the retardation film; a common electrode on an inner surface of the second substrate; and a liquid crystal layer between the first and second substrates.

10 Claims, 5 Drawing Sheets

TRANSFLECTIVE TYPE LIQUID CRYSTAL DISPLAY DEVICE HAVING RETARDATION FILM AND METHOD OF FABRICATING THE SAME

This application claims the benefit of Korean Patent Application No. 2003-0100324, filed on Dec. 30, 2003, which is hereby incorporated by reference for all purposes as if set forth herein.

BACKGROUND OF THE INVENTION

1. Field of the Invention

The present invention relates to a display device and a method of fabricating a display device, and more particularly, to a transflective liquid crystal display device having a retardation film, and a method of fabricating the same.

2. Discussion of the Related Art

In general, liquid crystal display (LCD) devices are classified into a transmissive type and a reflective type according to the light source used. Since the LCD device is a non-emissive type display device, an additional light source is required to illuminate the device. In a transmissive type LCD device, a backlight unit disposed under an LCD panel produces light and a transmittance of the LCD panel is adjusted according to an alignment state of a liquid crystal layer, thereby displaying images. While the transmissive type LCD device displays bright images in dark environments due to an artificial light source such as a backlight unit, the power consumption of the LCD device increases due to that backlight unit. In a reflective type LCD device, since the ambient artificial or natural light is used, power consumption of the reflective type LCD device is smaller than that of the transmissive type LCD device.

In the reflective LCD device, a reflective layer of a metallic material having a high reflectance is formed on a first substrate while a common electrode of a transparent conductive material is formed on a second substrate. Even though the low power consumption of the reflective type LCD device is improved, the reflective type LCD device may not be used where the ambient light is weak or absent.

In order to overcome such problems, a transflective type LCD device has been researched and developed. The transflective type LCD device can be switched from a transmissive mode using transmission of light to a reflective mode using reflection of light according to the user's selection. Accordingly, the disadvantages of the transmissive type LCD device and the reflective type LCD device such as high power consumption and low brightness under dark surroundings, respectively, are improved.

FIG. 1 is an exploded perspective view of a transflective type liquid crystal display device according to the related art. In FIG. 1, a liquid crystal panel 9 includes an upper substrate 24, a lower substrate 16 and a liquid crystal layer 30 interposed between the upper and lower substrates 24 and 16. A black matrix 17 is formed on the upper substrate 24 and a color filter layer 19 including sub-color filters is formed on the black matrix 17. A common electrode 22 is formed on the color filter layer 19. A reflective electrode 18, a transparent electrode 15 and a thin film transistor (TFT) "T" as a switching element are formed on the lower substrate 16 in a pixel region "P." The pixel region "P" defined by a gate line 25 and a data line 27 includes a transmissive portion "C" and a reflective portion "D," and the reflective electrode 18 corresponds to the reflective portion "D." The upper substrate 24 and the lower substrate 16 may be referred to as a color filter substrate and an array substrate, respectively. The TFT "T" disposed in matrix is connected to the gate line 25 and the data line 27. In addition, the reflective electrode 18 includes one of aluminum (Al) and aluminum (Al) alloy, and the transparent electrode 15 includes one of indium-tin-oxide (ITO) and indium-zinc-oxide (IZO).

FIG. 2 is a schematic cross-sectional view of a transflective type liquid crystal display device according to the related art. For illustration of the light path, a color filter layer is omitted. In FIG. 2, a transparent electrode 15 and a reflective electrode 18 are sequentially formed on an inner surface of a lower substrate 16. A first retardation film 14 such as a quarter wave plate (QWP) and a lower polarizing plate 12 are sequentially formed on an outer surface of the lower substrate 16. In addition, a backlight unit 11 is disposed outside the lower polarizing plate 12.

A common electrode 22 is formed on an inner surface of an upper substrate 24. A second retardation film 26 and an upper polarization plate 28 are sequentially formed on an outer surface of the upper substrate 24. Further, a liquid crystal layer 30 is formed between the reflective electrode 18 and the common electrode 22 and between the transparent electrode 15 and the common electrode 22.

The first and second retardation films 14 and 26 change a polarization state of light. For example, when light passes through one of the first and second retardation films 14 and 26, a linear polarization state is transformed into a circular polarization state and a circular polarization state is transformed into a linear polarization state. The second retardation film 26 is formed to improve a polarization property in a reflective portion and the first retardation film 14 is formed to compensate for the inducement of gray due to the second retardation film 26. Polarization states of light passing through each layer of a transflective type LCD device are illustrated hereinafter.

FIGS. 3A and 3B are schematic views illustrating polarization states of light passing through a reflective portion of a transflective type liquid crystal display device according to the related art. FIG. 3A illustrates polarization states of an OFF state where an electric field is not applied to a liquid crystal layer and FIG. 3B illustrates polarization states of an ON state where an electric field is applied to a liquid crystal layer. In FIGS. 3A and 3B, the polarization states are represented by arrows when the light is observed behind.

In FIG. 3A, unpolarized light enters an upper polarizing plate 28 and only linearly polarized light having a polarization direction parallel to a polarization axis of the upper polarizing plate 28 passes through the upper polarizing plate 28. For example, the upper polarization plate 28 transmits a linearly polarized light having a polarization direction of 45° to a second retardation film 26. The linearly polarized light having a polarization direction of 45° is transformed into a left-handed circularly polarized light by the second retardation film 26 and the left-handed circularly polarized light enters a liquid crystal layer 30. Since the liquid crystal layer 30 in an OFF state has a polarization transform property (phase modulation property) of a quarter wavelength ($\lambda/4$) retardation value, the left-handed circularly polarized light is transformed into a linearly polarized light having a polarization direction of 45°. The linearly polarized light having a polarization direction of 45° is transformed into a linearly polarized light having a polarization direction of 135° while reflecting at a reflective electrode 18. The linearly polarized light having a polarization direction of 135° is transformed into a left-handed circularly polarized light while passing through the liquid crystal layer 30 and the left-handed circularly polarized light is transformed into a linearly polarized light having a polarization direction of 135° by the second retardation film 26. Since the linearly polarized light having a polarization direction of 135° is observed behind, the linearly polarized light having a polarization direction of 135° has the same polarization direction as the polarization axis of the upper polarizing plate 28. Accordingly, the linearly polarized light having a polarization direction of 135° passes through the upper polarization plate 28 and a white image is displayed.

In FIG. 3B, non-polarized light enters an upper polarizing plate 28 and only linearly polarized light having a polarization direction parallel to a polarization axis of the upper polarizing plate 28 passes through the upper polarizing plate 28. For example, the upper polarization plate 28 transmits a linearly polarized light having a polarization direction of 45° to a second retardation film 26. The linearly polarized light having a polarization direction of 45° is transformed into a left-handed circularly polarized light by the second retardation film 26 and the left-handed circularly polarized light enters a liquid crystal layer 30. Since the liquid crystal layer 30 in an ON state does not have a polarization transform property (phase modulation property), the left-handed circularly polarized light is not transformed even after passing through the liquid crystal layer 30. The left-handed circularly polarized light is transformed into a right-handed circularly polarized light while reflecting at a reflective electrode 18. The right-handed circularly polarized light is not transformed while passing through the liquid crystal layer 30. The right-handed circularly polarized light is transformed into a linearly polarized light having a polarization direction of 45° by the second retardation film 26. Since the linearly polarized light having a polarization direction of 45° is observed behind, a polarization direction of 45° for the linearly polarized light is perpendicular to the polarization axis of the upper polarizing plate 28. Accordingly, the linearly polarized light having a polarization direction of 45° does not pass through the upper polarization plate 28 and a black image is displayed.

As a result, a white image and a black image are clearly displayed in a reflective portion of the transflective type LCD device using the second retardation film 26. However, the second retardation film 26 diminishes the optical properties in a transmissive portion of the transflective type LCD device. Accordingly, an additional retardation film is required to compensate for the diminished optical properties in the transmissive portion of the transflective type LCD device.

FIG. 4A is a schematic view illustrating polarization states of light passing through a transmissive portion of a transflective type liquid crystal display device having one retardation film according to the related art and FIG. 4B is a schematic view illustrating polarization states of light passing through a transmissive portion of a transflective type liquid crystal display device having two retardation films according to the related art. FIGS. 4A and 4B show polarization states of an ON state where an electric field is applied to a liquid crystal layer in a transflective type liquid crystal display device. In FIGS. 4A and 4B, the polarization states are represented by arrows when the light is observed behind.

In FIG. 4A, non-polarized light enters a lower polarizing plate 12 and only linearly polarized light having a polarization direction parallel to a polarization axis of the lower polarizing plate 12 passes through the lower polarizing plate 12. For example, the lower polarization plate 12 transmits a linearly polarized light having a polarization direction of 45° to a liquid crystal layer 30. Because the liquid crystal layer 30 in an ON state does not have a polarization transform property (phase modulation property), the linearly polarized light having a polarization direction of 45° is not transformed even after passing through the liquid crystal layer 30. The linearly polarized light having a polarization direction of 45° is transformed into a left-handed circularly polarized light while passing through a second retardation film 26. Because the left-handed circularly polarized light has a component having a polarization direction parallel to a polarization axis of an upper polarizing plate 28, the component of the left-handed circularly polarized light passes through the upper polarizing plate 28 and a gray image is displayed. Accordingly, a white image is not clearly displayed in a transmissive portion of the transflective type LCD device having one retardation film.

In FIG. 4B, non-polarized light enters a lower polarizing plate 12 and only linearly polarized light having a polarization direction parallel to a polarization axis of the lower polarizing plate 12 passes through the lower polarizing plate 12. For example, the lower polarization plate 12 transmits a linearly polarized light having a polarization direction of 45° to a first retardation film 14. The linearly polarized light having a polarization direction of 45° is transformed into a left-handed circularly polarized light by the first retardation film 14 and the left-handed circularly polarized light enters a liquid crystal layer 30. Because the liquid crystal layer 30 in an ON state does not have a polarization transform property (phase modulation property), the left-handed circularly polarized light is not transformed even after passing through the liquid crystal layer 30. The left-handed circularly polarized light is transformed into a linearly polarized light having a polarization direction of 45° while passing through a second retardation film 26. Because the linearly polarized light having a polarization direction of 45° is observed behind, a polarization direction of 45° for the linearly polarized light is perpendicular to a polarization axis of an upper polarizing plate 28. Accordingly, the linearly polarized light having a polarization direction of 45° does not pass through the upper polarization plate 28 and a black image is displayed.

As a result, the first and second retardation films 14 and 26 are required to display a white image and a black image clearly in a transmissive portion of the transflective type LCD device. This additional retardation film complicates the fabrication process and fabrication time, thereby increasing production cost.

FIG. 5 is a schematic cross-sectional view of a transflective type liquid crystal display device according to another related art. In FIG. 5, first and second substrates "G1" and "G2" face and are spaced apart from each other. A transparent electrode 54 and a reflective electrode 52 are sequentially formed on an inner surface of the first substrate "G1" having a transmissive portion "C" and a reflective portion "D." The reflective electrode 52 has an open portion corresponding to the transmissive portion "C" and a first retardation film 56 is formed on the transparent electrode 54 in the opening of the reflective electrode 52. A lower polarizing plate 80 is formed on an outer surface of the first substrate "G1" and a backlight unit 70 is disposed outside the lower polarizing plate 80. In addition, a common electrode 58 is formed on an inner surface of the second substrate "G2." A second retardation film 60 and an upper polarizing plate 62 are sequentially formed on an outer surface of the second substrate "G2." Further, a liquid crystal layer 90 is formed between the reflective electrode 52 and the common electrode 58 and between the first retardation film 56 and the common electrode 58.

A white image and a black image are clearly displayed in a transmissive portion due to the first and second retardation films 56 and 60. However, because the first retardation film 56 is formed on the transparent electrode 54, an additional photolithographic process is required. Moreover, the first retardation film may deteriorate during this additional photolithographic process. Therefore, production yield is reduced.

SUMMARY OF THE INVENTION

Accordingly, the present invention is directed to a transflective type liquid crystal display device having retardation film and method of fabricating the same that substantially obviates one or more of the problems due to limitations and disadvantages of the related art.

An advantage of the present invention is to provide a liquid crystal display device and a method of fabricating a liquid crystal display device having an improved production yield due to reduction in the complexity of the fabrication process and having moderate manufacturing costs.

Accordingly, the present invention is directed to a transflective type liquid crystal display device and a method of fabricating a transflective type LCD device that substantially obviate one or more of the problems due to limitations and disadvantages of the related art.

The present invention provides a transflective type LCD device selectively having a retardation film in a transmissive portion and a method of fabricating the same.

The present invention provides a transflective type LCD device having an improved brightness and a method of fabricating the same.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a reflective type liquid crystal display device includes: first and second substrates facing each other and having a transmissive portion and a reflective portion; a first polarizing plate on an outer surface of the first substrate; a transparent electrode over an inner surface of the first substrate; a reflective electrode having an open portion corresponding to the transmissive portion; a retardation film on an outer surface of the second substrate, the retardation film including a first portion having a first retardation value and a second portion having a second retardation value different from the first retardation value; a second polarizing plate on the retardation film; a common electrode on an inner surface of the second substrate; and a liquid crystal layer between the first and second substrates.

Further, a retardation film for a reflective type liquid crystal display device includes: a transparent film having a first portion and a second portion; an orientation film on the transparent film, the orientation film in the first portion being aligned along an alignment direction and the orientation film in the second portion being not aligned; and a liquid crystal layer including liquid crystal molecules on the orientation film.

Moreover, a method of fabricating a reflective type liquid crystal display device includes: first and second substrates facing each other and having a transmissive portion and a reflective portion; forming a first polarizing plate on a first surface of a first substrate having a transmissive portion and a reflective portion; forming a transparent electrode over a second surface of the first substrate; forming a reflective electrode having an open portion corresponding to the transmissive portion; forming a retardation film on a first surface of a second substrate, the retardation film including a first portion having a first retardation value and a second portion having a second retardation value different from the first retardation value; forming a second polarizing plate on the retardation film; forming a common electrode on a second surface of the second substrate; forming a liquid crystal layer between the first and second substrates; and attaching the first and second substrate such that the transparent electrode faces the common electrode.

Beyond this, a method of fabricating a retardation film for a reflective type liquid crystal display device included: forming an orientation film on a transparent film having a first portion and a second portion; aligning the orientation film in the first portion along an alignment direction; and forming a liquid crystal layer including liquid crystal molecules on the orientation film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 1:
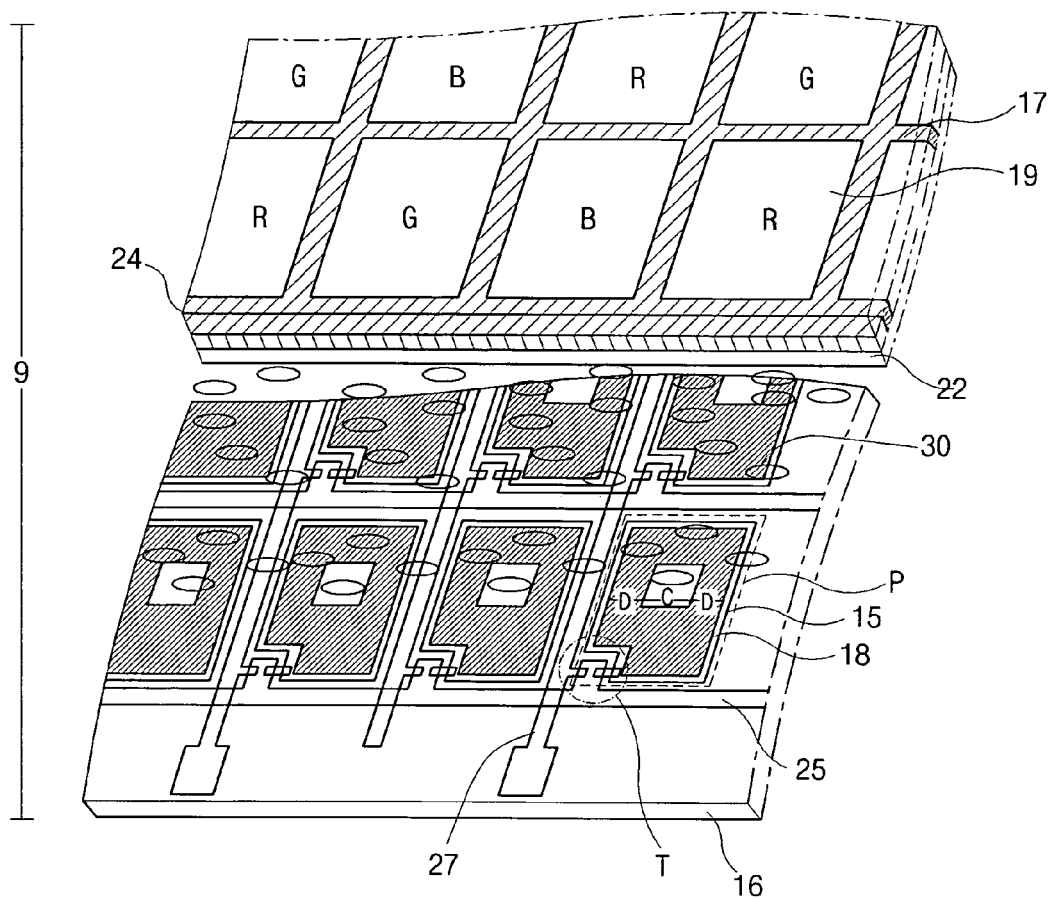
FIG. 1 is an exploded perspective view of a transflective type liquid crystal display device according to the related art.
Figure 2:
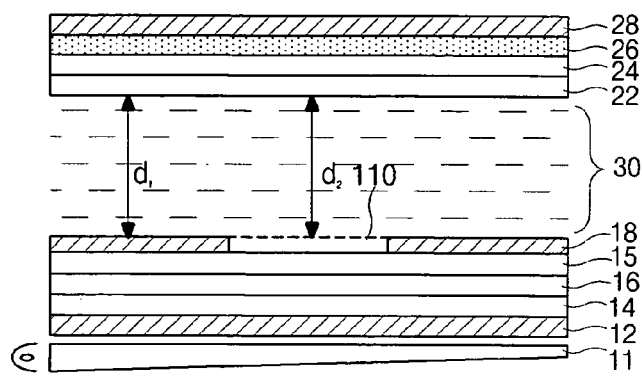
FIG. 2 is a schematic cross-sectional view of a transflective type liquid crystal display device according to the related art.
Figure 3A:
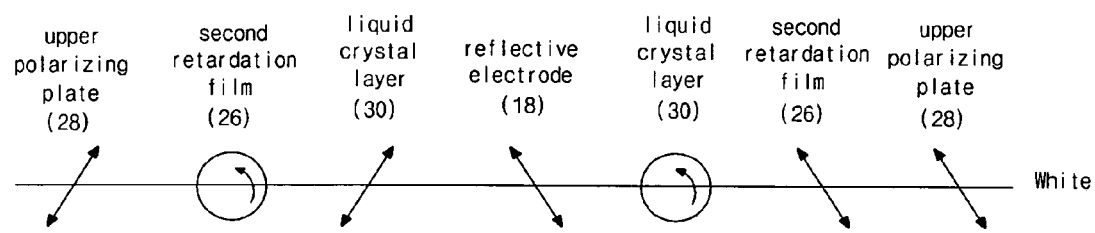
FIGS. 3A and 3B are schematic views illustrating polarization states of light passing through a reflective portion of a transflective type liquid crystal display device according to the related art.
Figure 3B:
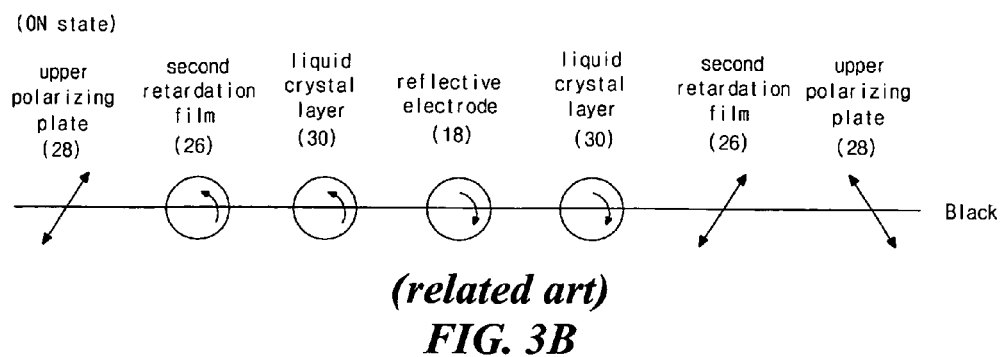
Figure 4A:
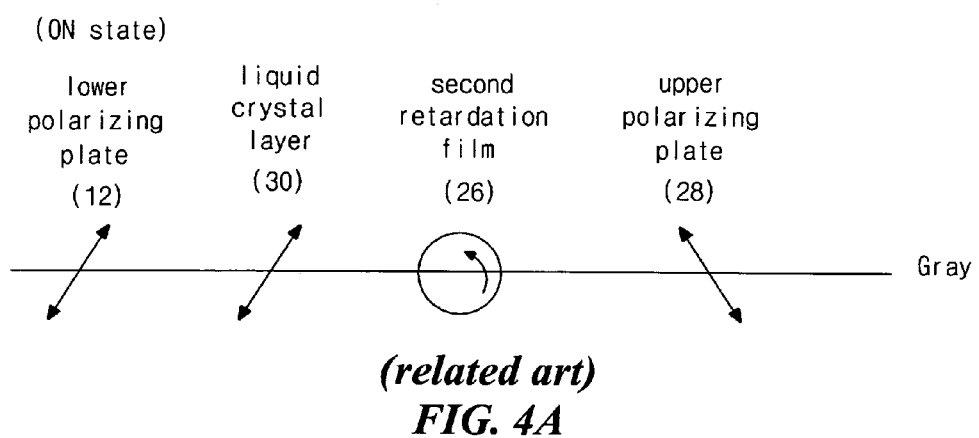
FIG. 4A is a schematic view illustrating polarization states of light passing through a transmissive portion of a transflective type liquid crystal display device having one retardation film according to the related art.
Figure 4B:
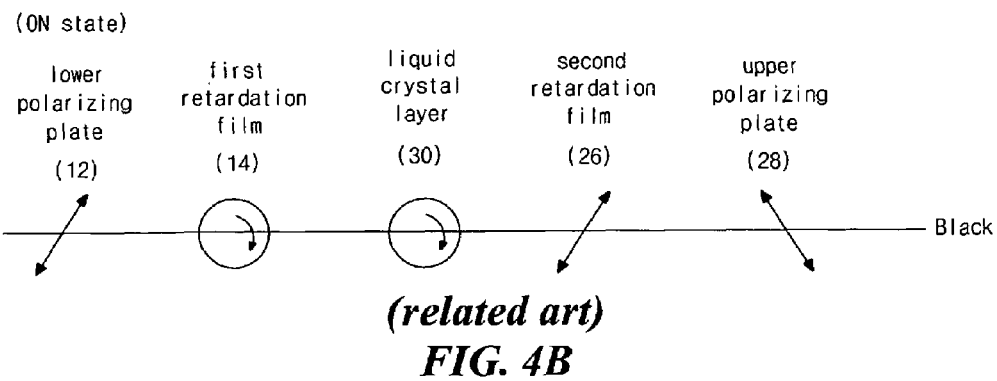
FIG. 4B is a schematic view illustrating polarization states of light passing through a transmissive portion of a transflective type liquid crystal display device having two retardation films according to the related art.
Figure 5:
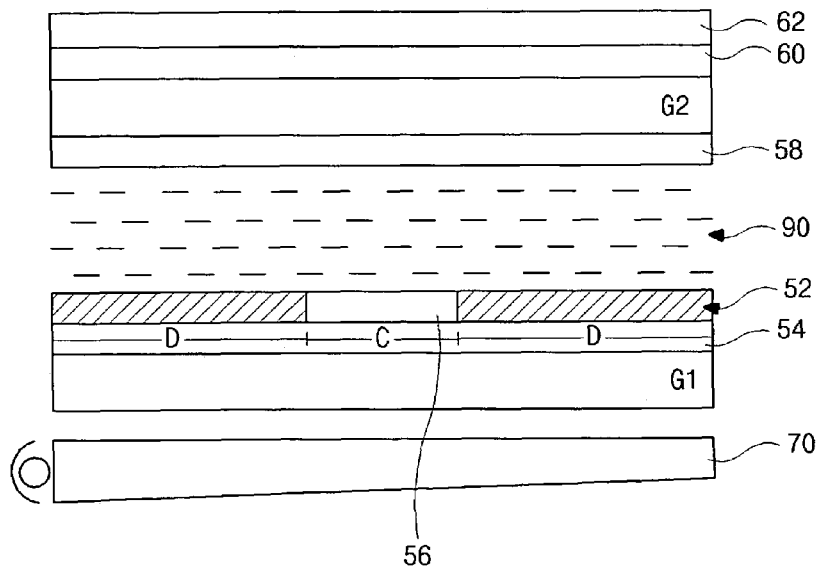
FIG. 5 is a schematic cross-sectional view of a transflective type liquid crystal display device according to another related art.
Figure 6:
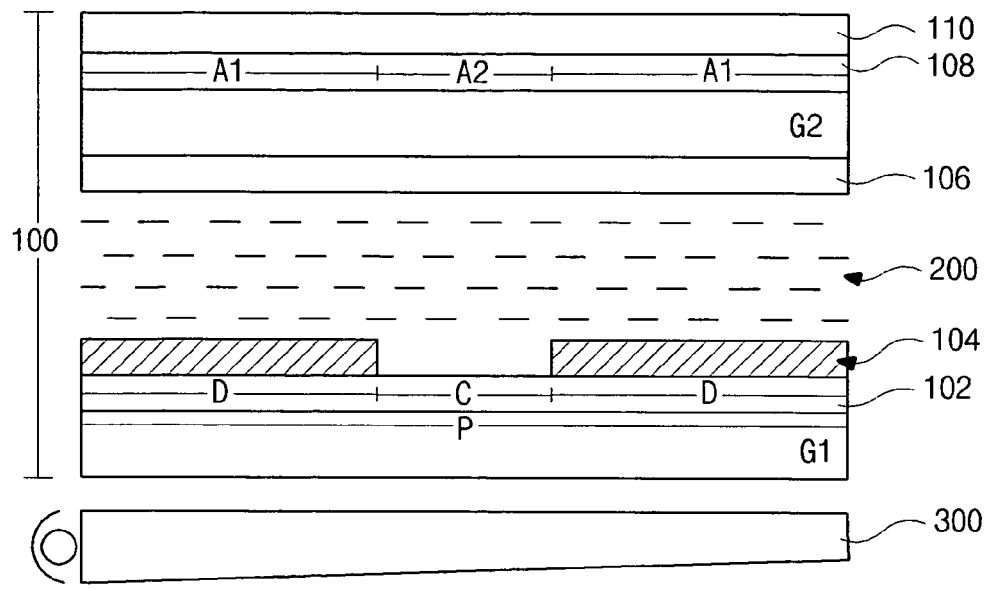
FIG. 6 is a schematic cross-sectional view of a transflective type LCD device according to an embodiment of the present invention.

FIG. 6 is a schematic cross-sectional view of a transflective type LCD device according to an embodiment of the present invention.

In FIG. 6, a transflective type liquid crystal display (LCD) device 100 includes a first substrate "G1" and a second substrate "G2" facing and spaced apart from each other. The first and second substrates "G1" and "G2" have a pixel region "P" as a unit for displaying images and the pixel region "P" includes a transmissive portion "C" and a reflective portion "D." The pixel region "P" may be defined by a gate line (not shown) and a data line (not shown) crossing each other. A switching element (not shown) such as a thin film transistor (TFT) may be connected to the gate line and the data line. A first polarizing plate 250 is formed on an outer surface of the first substrate "G1" and a backlight unit 300 is disposed outside the first polarizing plate 250. A transparent electrode 102 is formed on an inner surface of the first substrate "G1" and a reflective electrode 104 is formed on the transparent electrode 102. The reflective electrode includes an open portion corresponding to the transmissive portion "C." The transparent electrode 102 may be connected to the switching element. In addition, the reflective electrode 104 may be connected to the switching element or may not be connected to the switching element. A common electrode 106 is formed on an inner surface of the second substrate "G2."

A retardation film 108 and a second polarizing plate 110 are sequentially formed on an outer surface of the second substrate "G2." The retardation film 108 includes a first portion "A1" having a polarization transform property (phase modulation property) of a quarter wavelength (λ/4) retardation value and a second portion "A2" not having a polarization transform property (phase modulation property). Accordingly, a polarization state of a light is transformed when passing through the first portion "A1," while a polarization state of a light is not transformed when passing through the second portion "A2." For example, a circularly polarized light may be transformed into a linearly polarized light by the first portion "A1" of the retardation film 108 and a linearly polarized light may be transformed into a circularly polarized light by the first portion "A1" of the retardation film 108. The first and second portions "A1" and "A2" correspond to the reflective and transmissive portions "D" and "C," respectively. The retardation film 108 may be formed by aligning a liquid crystal layer on a transparent film.

Figure 7A:
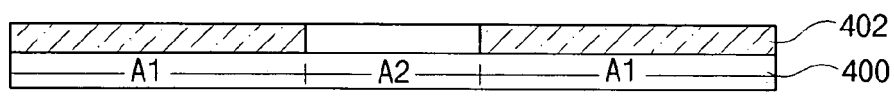
FIGS. 7A and 7B are schematic cross-sectional views illustrating a method of fabricating a retardation film for a transflective type LCD device according to an embodiment of the present invention.
Figure 7B:
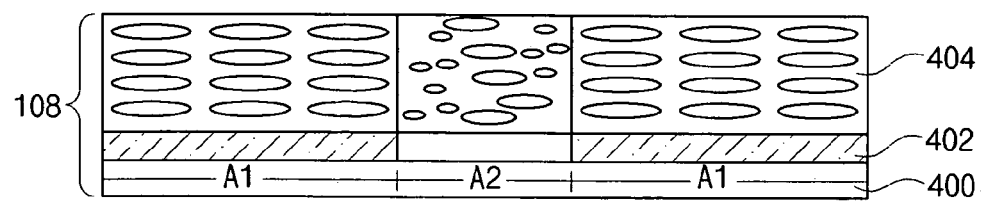

FIGS. 7A and 7B are schematic cross-sectional views illustrating a method of fabricating a retardation film for a transflective type LCD device according to an embodiment of the present invention.

In FIG. 7A, a retardation orientation film 402 is formed on a retardation transparent film 400 having a first portion "A1" and a second portion "A2" by coating a resin such as polyimide. The retardation orientation film 402 may be selectively aligned in a predetermined portion. For example, the retardation orientation film 402 in the first portion "A1" may be aligned along a predetermined direction, while the retardation orientation film 402 in the second portion "A2" may not be aligned. Accordingly, the retardation orientation film 402 in the first portion "A1" may have an alignment direction, while the retardation orientation film 402 in the second portion "A2" may not have an alignment direction. The retardation orientation film 402 may be aligned through a rubbing method or a photo-alignment method.

In a rubbing method, a photosensitive pattern is formed on the retardation orientation film 402. The photosensitive pattern shields the retardation orientation film 402 in the second portion "A2" to expose the retardation orientation film 402 in the first portion "A1." The retardation orientation film 402 is rubbed using the photosensitive pattern as a rubbing mask so that the retardation orientation film 402 in the first portion "A1" can be aligned along an alignment direction and the retardation orientation film 402 in the second portion "A2" can not be aligned. Accordingly, the retardation orientation film 402 in the first portion "A1" has an alignment direction, while the retardation orientation film 402 in the second portion "A2" does not have an alignment direction.

In a photo-alignment method, a light such as ultraviolet (UV) light is selectively irradiated onto the retardation orientation film 402 in the first portion "A1." Since the light causes a chemical reaction in the retardation orientation film 402, the retardation orientation film 402 in the first portion "A1" is aligned along an alignment direction. However, the retardation orientation film 402 in the second portion "A2" is not aligned because the retardation orientation film 402 in the second portion "A2" is not irradiated. Accordingly, the retardation orientation film 402 in the first portion "A1" has an alignment direction, while the retardation orientation film 402 in the second portion "A2" does not have an alignment direction.

In FIG. 7B, a retardation liquid crystal layer 404 is formed on the retardation orientation film 402. For example, the retardation liquid crystal layer 404 may include nematic liquid crystal molecules, which are horizontally aligned by the retardation orientation film 402. It is understood that other liquid crystal layers may be used as well. The liquid crystal molecules of the retardation liquid crystal layer 404 in the first portion "A1" are aligned along the alignment direction of the retardation orientation film 402 in the first portion "A1." However, because the retardation orientation film 402 in the second portion "A2" does not have an alignment direction, the liquid crystal molecules of the retardation liquid crystal layer 404 in the second portion "A2" are randomly aligned. Accordingly, a polarization state of a light is transformed when passing through the retardation liquid crystal layer 404 in the first portion "A1," while a polarization state of a light is not transformed when the light passes through the retardation liquid crystal layer 404 in the second portion "A2." The retardation transparent film 400, the retardation orientation film 402 and the retardation liquid crystal layer 404 constitute a retardation film 108. Even though it is not illustrated in FIGS. 7A and 7B, an adhesive layer may be formed on the retardation liquid crystal layer 404 or an outer surface of the retardation transparent film 400. The adhesive layer may be attached to the outer surface of the second substrate "G2."

In a reflective type LCD device according to the present invention, a retardation film includes a first portion having a polarization transform property (phase modulation property) of a quarter wavelength (λ/4) retardation value and a second portion not having a polarization transform property (phase modulation property). Accordingly, a polarization state of a light is transformed when the light passes through the first portion corresponding to a reflective portion of the reflective type LCD device, and a polarization state of a light is not transformed when it passes through the second portion corresponding to a transmissive portion of the reflective type LCD device. As a result, an additional retardation film is not required, and the manufacturing cost and size of the reflective type LCD device are reduced. In addition, the brightness of the reflective type LCD device is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A reflective type liquid crystal display device, comprising:
    first and second substrates facing each other and having a transmissive portion and a reflective portion;
    a first polarizing plate on an outer surface of the first substrate;
    a transparent electrode over an inner surface of the first substrate;
    a reflective electrode having an open portion corresponding to the transmissive portion;
    a retardation film including:
        a retardation transparent film;
        a retardation orientation film on the retardation transparent film, the retardation orientation film in a first portion being aligned along an alignment direction and the retardation orientation film in a second portion being unaligned; and
        a retardation liquid crystal layer including liquid crystal molecules on the retardation orientation film,
    wherein the retardation film is formed on an outer surface of the second substrate, and includes a first portion having a first retardation value and a second portion having a second retardation value different from the first retardation value;
    a second polarizing plate on the retardation film;
    a common electrode on an inner surface of the second substrate; and
    a liquid crystal layer between the first and second substrates.

2. The reflective type liquid crystal display device according to claim 1, wherein the first and second portions correspond to the reflective and transmissive portions, respectively.

3. The reflective type liquid crystal display device according to claim 1, wherein the first and second retardation values are substantially quarter wavelength ($\lambda/4$) and zero, respectively.

4. The reflective type liquid crystal display device according to claim 1, wherein the liquid crystal molecules in the first portion are aligned along the alignment direction and the liquid crystal molecules in the second portion are randomly aligned.

5. The reflective type liquid crystal display device according to claim 1, wherein the liquid crystal molecules include a nematic liquid crystal.

6. The reflective type liquid crystal display device according to claim 1, further comprising an adhesive layer on one of an outer surface of the retardation transparent film and the retardation liquid crystal layer.

7. The reflective type liquid crystal display device according to claim 1, wherein the transparent electrode is formed between the first substrate and the reflective electrode.

8. The reflective type liquid crystal display device according to claim 1, wherein the reflective electrode is formed between the first substrate and the transparent electrode.

9. The reflective type liquid crystal display device according to claim 1, further comprising a gate line over the first substrate, a data line crossing the gate line and a thin film transistor connected to the gate line and the data line.

10. The reflective type liquid crystal display device according to claim 9, wherein the transparent electrode is connected to the thin film transistor.

* * * * *